United States Patent [19]
Verjux

[11] 3,887,059
[45] June 3, 1975

[54] DEVICE FOR ALIGNING CYLINDRICAL ARTICLES

[75] Inventor: Jean Verjux, Pavillons sous Bois, France

[73] Assignee: Usines Decoufle, Paris, France

[22] Filed: Dec. 21, 1973

[21] Appl. No.: 427,095

[30] Foreign Application Priority Data
Jan. 4, 1973 France .............................. 73.00228

[52] U.S. Cl. .............................. 198/20 C; 198/32
[51] Int. Cl. ............................................ B65g 47/00
[58] Field of Search ..................... 198/32, 25, 20 C

[56] References Cited
UNITED STATES PATENTS
| | | | |
|---|---|---|---|
| 1,906,014 | 4/1933 | Ruau | 198/20 C |
| 1,974,032 | 9/1934 | Molins | 198/20 C |
| 3,164,243 | 1/1965 | Rudszinat et al. | 198/32 |
| 3,311,008 | 3/1967 | Schubert | 198/32 X |

Primary Examiner—Evon C. Blunk
Assistant Examiner—James M. Slattery
Attorney, Agent, or Firm—Amster & Rothstein

[57] ABSTRACT

This device is intended for directing the filter plugs deposited into the peripheral grooves of a cutting drum from a plurality of rows into a single aligned row of plugs while transferring into the grooves or notches of another drum by reason of one plug per groove or notch. To this end, intermediate conveyors are utilized which are equal in number to the plugs contained in each groove or notch of the cutting drum, the conveyors rotating at the same speed about an axis parallel to the axes of said first and other drums, while being shifted angularly by a circumferential half-pitch in relation to the grooves or notches of the other drum. This device is suitable for aligning double-length filter-tips in cigarette-manufacturing processes.

3 Claims, 4 Drawing Figures

3,887,059

DEVICE FOR ALIGNING CYLINDRICAL ARTICLES

BACKGROUND OF THE INVENTION

In the manufacture of cigarette filter-tips the conventional method consists in disposing a double-length filter plug between two cigarettes, this assembly being aligned for example in the groove of a drum, assembling the three elements by means of a paper strip usually referred to as a sleeve and roller and glued to the filter-tip surface and also to the end portions of the two cigarettes, and finally cutting this assembly in two, centrally of the filter-tip.

Usually, the machine is fed with filter rods of a length corresponding to four to six times the length of a single cigarette filter-tip. These filter rods are delivered from a magazine to a conveyor, such as a grooved drum, and cut by means of rotary blades or cutters into plugs having each twice the length contemplated for the cigarette filter-tip.

Then, the double-length filter plugs disposed side by side in the drum grooves must be moved in such a way that they eventually constitute a same and single row and can thus be inserted between two cigarettes with which each plug is to be associated.

SUMMARY OF THE INVENTION

The present invention relates to a device designed for disposing in a single row the double-length filter plugs, this machine comprising to this end, between a cutting drum having spaced transverse grooves, on which the filter rods are cut into double-length plugs, i.e plugs having twice the length of the filter-tip contemplated for each cigarette, and a re-centering drum formed with spaced transverse grooves adapted to receive only one double-length filter plug per groove, intermediate conveyors equal in number to the plugs contained in each groove of the cutting drum (i.e. generally two or three), each intermediate conveyor comprising means for picking up a plug from a cutting drum groove and transferring said plug into a groove of said centering drum, this device being characterised in that said means rotates at the same speed about a common axis parallel to that of said cutting and recentering drums, and that they are offset angularly from one conveyor to the other, so that they pick up in succession the various plugs aligned in a same groove of the cutting drum and deposit said plugs into successive grooves of the recentering drum, by reason of one per groove.

According to a typical and preferred embodiment of this invention, said means comprise fingers adapted to engage said plugs when, during their rotation about their common axis, they are tangent to said cutting drum, at different distances from their common axis, this distance being however the same for each intermediate conveyor, due to the angular shift provided between the fingers of the various conveyors, in combination with other means restoring along these fingers at least the plugs less remote from the axis of rotation of said conveyors to a same distance from said axis which is adequate for depositing said plugs into the grooves of the re-centering drum.

DESCRIPTION OF THE PREFERRED EMBODIMENT

Figure 1:
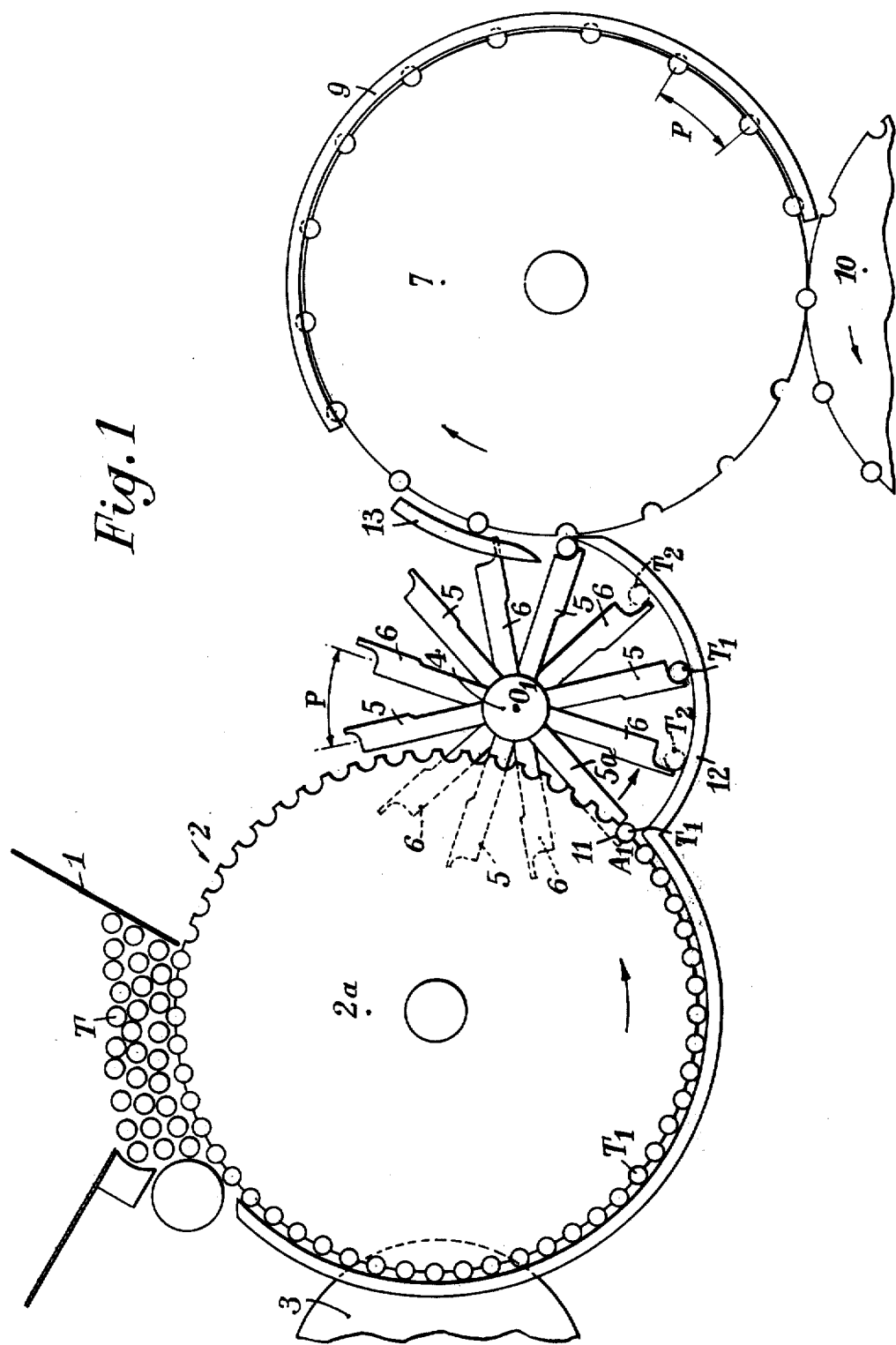
FIG. 1 illustrates diagrammatically in side elevational view the device of this invention.
Figure 2:
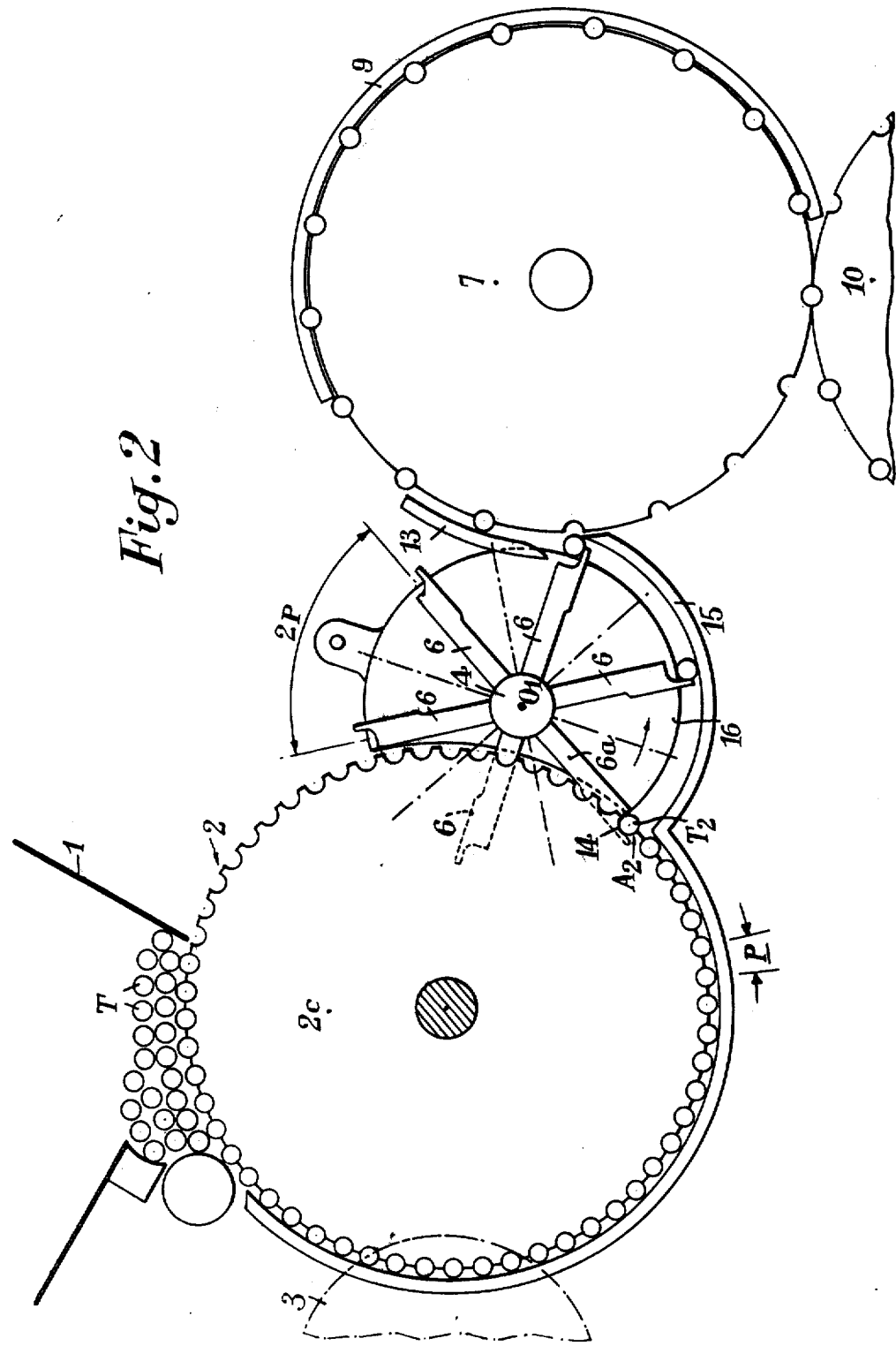
FIG. 2 is a similar view of the device from which the first intermediate distributor has been removed.

The magazine 1 shown in FIGS. 1 and 2 is filled with filter rods T corresponding in this example to four filter-tips; these rods T are delivered into the grooves or notches of cutting drum 2, each rod being cut by the circular blade 3 into two plugs $T_1$ and $T_2$ having each twice the length contemplated for the filter tip of the cigarette.

About a common shaft 4 two intermediate conveyors are rotatably mounted, their radial arms 5, 6 of same outer diameter being adapted to transfer the ones, the plugs $T_1$, and the others, the plugs $T_2$, from cutting drum 2 to re-centering drum 7. This re-centering drum also comprises transverse grooves or notches having a peripheral pitch P usually of the order of 35 mm. The two intermediate conveyors comprise each the same number of arms 5, 6, the finger-like outer end of each arm being shaped to constitute somewhat a half-groove or notch, the circumferential relative spacing of these half-grooves or notches corresponding to 2P, and the arms 5 of the first intermediate conveyor are shifted by a half-pitch or P in relation to the arms 6 of the other intermediate conveyor.

Figure 4:
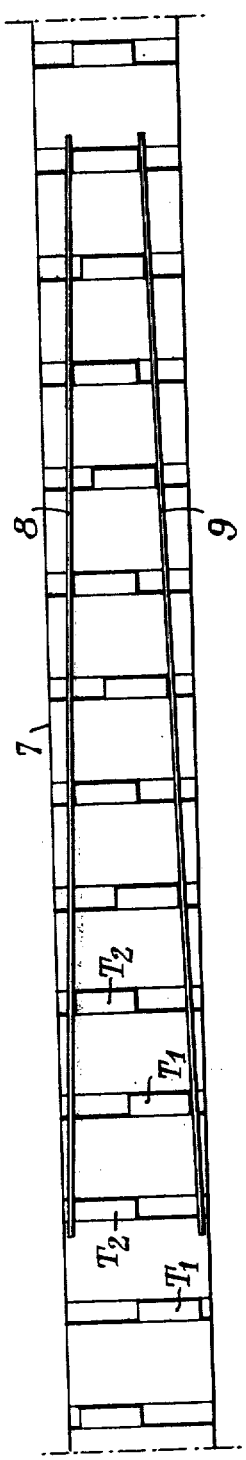

As will be explained presently, the filter plugs $T_1$ and $T_2$ are eventually delivered to the re-centering drum 7 formed to this end with successive transverse grooves, but with the transverse relationship they had on drum 2, as shown in FIG. 4.

During the rotation of drum 7 two convergent ramps 8 and 9 cause the plugs $T_1$ and $T_2$ to be re-aligned symmetrically to the centre of the drum 7 into a single row which is then transferred to another drum 10.

Figure 3:
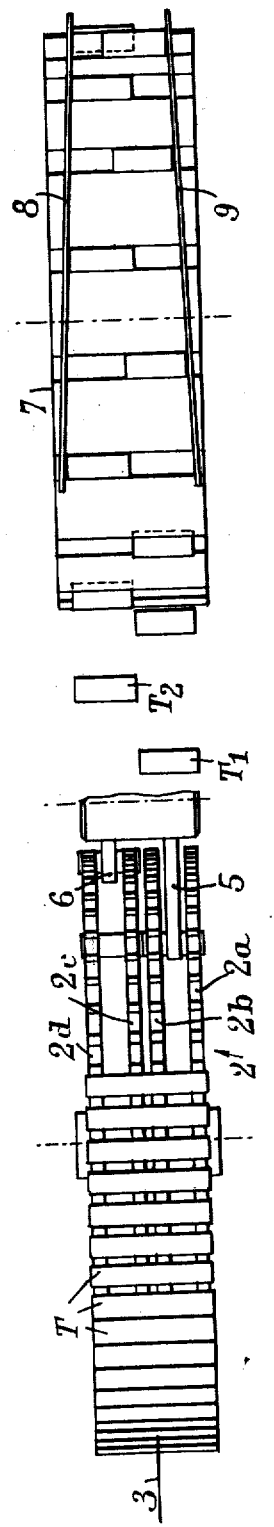
FIG. 3 is a plane view showing the central portion of the device only in diagrammatic from, and FIG. 4 is a developed view of the drum for re-centering the filter plugs in order to illustrate the path followed thereby.

FIGS. 1 to 3 illustrate the transfer action performed by the two intermediate conveyors between drums 2 and 7.

Actually, the drum 2 comprises four coaxial discs 2a, 2b, 2c and 2d in which the peripheral grooves or notches are cut; discs 2a and 2b carry the plugs $T_1$ and discs 2c, 2d the plugs $T_2$. Between the discs 2a and 2b, on the one hand, and 2c, 2d, on the other hand, free gaps are provided, of which the width is sufficient to permit the passage of the arms 5 and 6 of the intermediate conveyors (FIG. 3); each conveyor comprises a number of spaced radial arms, which is six in the example illustrated in FIGS. 1 and 2, with a circumferential pitch 2P, as already explained in the foregoing.

When a groove or notch of drum 2 moves past position $A_1$ (FIG. 1) in alignment with the straight line drawn form the axis $O_1$ of said intermediate conveyors to said point $A_1$ the half-groove 11 of arm 5a of the first conveyor begins the extraction of the plug $T_1$. This plug $T_1$ is carried along by the finger of said arm 5a while being retained by the circular ramp 12 centered at $O_1$. The transfer to drum 7 takes place as customary with the assistance of extractors 13 disposed on either side of said arms 5. The plugs $T_1$ are thus delivered in succession to every other groove or notch of said drum 7, since the circumferential pitch 2P between the half-grooves 11 of arms 5 is twice the pitch P between the grooves of drum 7.

The second intermediate conveyor comprises the same number of spaced radial arms 6 as the first conveyor, but its arms are shifted by a half-pitch P in relation to the arms 5 of said first intermediate conveyor, said arms 6 having the same length as the arms 5; however, their half-grooves 14 forming the plug-engaging fingers are somewhat deeper than those 11 of arms 5.

When the half-groove 14 of arm 6a begins to extract a plug $T_2$ the corresponding groove of drum 2 is at $A_2$ in alignment with the straight line $O_1 A_2$, i.e. the groove of drum 2 has moved through a half circumferential pitch $p$ of the drum grooves in relation to its position when the arm 5a of the first intermediate conveyor began its plug pick-up action; thus, plug $T_2$ is nearer to the center $O_1$ of the intermediate conveyor than the plug $T_1$, the difference being equal to $p/2$; it is restored to this same distance by an outer ramp or guide member 15 and a pair of inner ramps or guide members 16 on either side of arm 6. Thus, during the rotation of drum 4, the plugs $T_2$ move outwards until they are at the same distance from the centre $O_1$ as the plugs $T_1$ (the latters being constantly at this distance during their movement on the first intermediate conveyor).

Thus, the plugs $T_2$ carried by the second intermediate conveyor are transferred to the grooves of drum 7 in the same manner as the plugs $T_1$ of the first intermediate conveyor to other grooves of the same drum 7, by means of the extractors 13 disposed on either side of said radial arms 6.

Finally, the grooves of drum 7 receive by turns a plug $T_1$ and a plug $T_2$.

If each filter rod comprises six-filter-tips, the above-described arrangement is completed by a third intermadiate conveyor, so that the device will comprise likewise one intermediate conveyor per double-length filter plug.

Of course, the above embodiments are given by way of illustration, not of limitation, and therefore many modifications and changes may be brought thereto without departing from the basic principles of the invention. Thus, notably, the device as described hereinabove with particular reference to the handling of cigarette filter-tips initially in the form of filter rods may also be used for aligning sections, plugs or tips of any other desired cylindrical articles, as will be clearly apparent to those conversant with the art.

What is claimed as new is:

1. Device for aligning sections of cylindrical articles, particularly double-length filter tips in the form of plugs, for cigarette manufacturing comprising
   a source of filter tip supply units;
   a rotatable cutting drum having peripherally equal spaced first grooves to receive the plugs therein from said supply source;
   a rotatable re-centering drum having peripherally equal spaced second grooves;
   intermediate conveyor means located between said drums and associated therewith to transfer said plugs from said cutting drum to said re-centering drum;
   said conveyor means comprising a first rotatable conveyor and a second rotatable conveyor, both said conveyors being mounted on a common axis and having the same speed of rotation;
   said first conveyor comprising a plurality of first equal-sized radially extending equal-angularly spaced arms, each arm having a first notch formed at its outer end and adapted to remove an individual plug from a first groove in said cutting drum for transfer to a second groove in said re-centering drum;
   said second conveyor comprising a plurality of second equal-sized radially extending equal-angularly spaced arms, each second arm having a second notch formed at its outer end and adapted to remove an adjacent individual plug from said first groove in said cutting drum for transfer to a following second groove in said re-centering drum;
   said plurality of second arms being individually angularly spaced with respect to said first arms so that any individual arm on one said conveyor is located midway between two individual adjacent arms of the other said conveyor;
   the outer diameters of said arms of said first and second conveyors being equal; and
   said second notches of said second arms extending further radially inwardly than said first notches of said first arms.

2. Device according to claim 1 in which guide means are spaced adjacent said outer ends of said arms to retain said plugs in said notches during the transfer.

3. Device according to claim 1 in which extraction means are associated with said re-centering drum to assist the transfer of said plugs thereto.

* * * * *